United States Patent [19]

Hao et al.

[11] Patent Number: 4,924,384
[45] Date of Patent: May 8, 1990

[54] METHOD FOR CONTROLLING THE PEER-TO-PEER PROCESSING OF A DISTRIBUTED APPLICATION ACROSS A SYNCHRONOUS REQUEST/RESPONSE INTERFACE USING PUSH-DOWN STACK AUTOMATA

[75] Inventors: Ming C. Hao, Los Altos Hills; Ronald L. Obermarck, Redwood City; Gene E. Trivett; Lynn Trivett, both of Portola Valley, all of Calif.

[73] Assignee: International Business Machines Corporation, Armonk, N.Y.

[21] Appl. No.: 247,794

[22] Filed: Sep. 21, 1988

[51] Int. Cl.$^5$ ............................................. G06F 15/16
[52] U.S. Cl. ................................... 364/300; 364/200; 364/244; 364/244.6; 364/280; 364/280.6
[58] Field of Search .................... 364/200, 300, 900

[56] References Cited

U.S. PATENT DOCUMENTS

| | | | |
|---|---|---|---|
| 4,410,940 | 10/1983 | Carlson et al. | 364/200 |
| 4,430,699 | 2/1984 | Segarra et al. | 364/200 |
| 4,736,321 | 4/1988 | Brown et al. | 364/300 |
| 4,819,159 | 4/1989 | Shipley et al. | 364/200 |

OTHER PUBLICATIONS

Tenenbaum and Augenstein, "Data Structures Using PASCAL", copyright 1986, by Prentice-Hall, Inc. pp. 67–83.

*Primary Examiner*—Raulfe B. Zache
*Attorney, Agent, or Firm*—R. Bruce Brodie

[57] ABSTRACT

A method for coordinating recursive requests and responses in the peer-to-peer processing of a distributed application across a synchronous request/response interface. The method utilizes, on each side of the interface, a decision table and a local LIFO stack of generated and received requests, responses, and input from the application. The local stack is run in a push-pop manner and assists the local decision table in conducting the peer-to-peer processing until the LIFO stack becomes exhausted. A fault on either side of the interface results in undoing the processing by unwinding each stack back to a predetermined point. If one side operates as a persistent server, its application program environment is saved from one request to another by a dynamic save and simulated return to the application. Lastly, a request/demand is substituted for a demand/request by the server so as to change the server and requester roles of either side of the interface.

9 Claims, 5 Drawing Sheets

|     |                | Input from PWS AND Function in STACK IS | | | | Call to PWS KR AND Function in Stack IS | | | | Retrun to PWS KR Function in STACK | |
|-----|----------------|------|------|------|------|------|------|------|------|------|------|
|     |                | COL 1 | COL 2 | COL 3 | COL 4 | COL 5 | COL 6 | COL 7 | COL 8 | COL 9 | COL 10 |
|     |                | --   | 21   | 31   | 41   | --   | 21   | 31   | 41   | 31   | ELSE |
| ROW | Input Code is  |      |      |      |      |      |      |      |      |      |      |
| 1   | 21             | E    | A 1  | E    | A 1  | C 1  | C 1  | C 1  | C 1  | D    | D    |
| 2   | 22, 23         | E    | A 2  | E    | E    | F    | C 2  | F    | F    | D    | D    |
| 3   | 31             | E    | B 1  | B 1  | B 1  | C 1  | C 1  | C 1  | C 1  | D    | D    |
| 4   | 32, 33         | E    | E    | A 2  | E    | F    | F    | C 2  | F    | C 2  | D    |
| 5   | 41             | E    | A 1  | E    | A 1  | C 1  | C 1  | C 1  | C 1  | D    | D    |
| 6   | 42, 43         | E    | E    | E    | A 2  | F    | F    | F    | C 2  | D    | D    |

PWS KR   Actions
1 — Push Function on the Stack
2 — Pop The Function off the stack A — Return to Caller with Function Code and Data from PWS
B — Invoke (call) Named Function (KR , via CLS)
C — Send Function and any data to PWS D — Send Function 15 and Debug information to PWS
    Initiate Termination due to severe error E — Respond to PWS with Function 13 and Debug information
F — Return to Caller with 13 and Debug information

FIG. 3

| | | Input from Host AND Function in Stack IS | | | | Call to PWS REQ AND Function in Stack IS | | | | Retrun to PWS REQ Function in Stack | |
|---|---|---|---|---|---|---|---|---|---|---|---|
| | | COL 1 | COL 2 | COL 3 | COL 4 | COL 5 | COL 6 | COL 7 | COL 8 | COL 9 | COL 10 |
| | | -- | 21 | 31 | 41 | -- | 21 | 31 | 41 | 31 | ELSE |
| ROW | Input Code is | | | | | | | | | | |
| 1 | 21 | A 1 | A 1 | A 1 | A 1 | F | C 1 | C 1 | C 1 | D | D |
| 2 | 22, 23 | E | A 2 | E | E | F | C 2 | F | F | D | D |
| 3 | 31 | B 1 | B 1 | B 1 | B 1 | F | C 1 | C 1 | C 1 | D | D |
| 4 | 32, 33 | E | E | A 2 | E | F | F | C 2 | F | C 2 | D |
| 5 | 41 | A 1 | A 1 | A 1 | A 1 | F | C 1 | C 1 | C 1 | D | D |
| 6 | 42, 43 | E | E | E | A 2 | F | F | F | C 2 | D | D |

PWS KR   Actions
1 – Push Function on the Stack
2 – Pop The Function off the stack A – Return to Caller with Function Code and Data From PWS
B – Invoke (call) Named Function and Data from Host
B – Invoke (call) Named Function
C – Send Function to any data Host D – Send Function 15 and Debug information to Host
    Initiate Termination due to severe error E – Respond to Host with Function 13 and Debug information
F – Return to Caller with 13 and Debug information

FIG. 4

METHOD FOR CONTROLLING THE PEER-TO-PEER PROCESSING OF A DISTRIBUTED APPLICATION ACROSS A SYNCHRONOUS REQUEST/RESPONSE INTERFACE USING PUSH-DOWN STACK AUTOMATA

CROSS REFERENCE TO RELATED APPLICATION

Beitel et al., entitled "Method for Sharing Common Values Implicitly Among Communicating Generative Objects", filed Sept. 19, 1988.

FIELD OF THE INVENTION

This invention relates to distributed processing, and more particularly, to a method for managing the peer-to-peer processing of a distributed application across a synchronous request/response interface.

DESCRIPTION OF RELATED ART

Distributed Processing

Distributed processing via networking is increasingly used to reduce the time taken to complete an application and share the cost of specialized nodes, such as file servers and the like. Such processing is layered. This means that an application runs at the highest logical level and is visible to the user. Subordinate to this are various servers, coordinators, and the like on the same or other processors which interact and process information enabling the application to complete. The subordinate functions are usually transparent to the user.

One type of distributed configuration involves programmmable workstations (PWSs) operable as data processing environments (DPEs) and coupling a remote host. The host, in turn, might be operable as a knowledge processing environment (KPE). That is, a KPE is capable of processing applications involving rule-based code interspersed with procedural-based code. The interactions between processors occur over well-defined interfaces, usually of the synchronous request/response type.

Interactions between processes and/or processors in a symmetric relationship are denominated peer coupled. Information passes first in one direction and then in the other because of the half-duplex limitations of most request/response interfaces. Since KPEs are useful in applications in which a request may require additional information, one limitation of the art is that of failing to include a request for additional information in the types of responses. Thus, where a PWS-based DPE sends a request to a host-based KPE, the KPE in turn should be able to select a response from the set consisting of providing an answer, requesting additional information from the DPE, and indicating that a reply is not available.

Typically, the KPE may operate as a server and the DPEs as requesters. Provision is not made in the prior art for the server to persist from request to request. That is, there is no continuity between requests since the application programming environment is collapsed after the server replies to the requester. In a related but distinct vein, KPEs and DPEs programmed as servers and requesters respectively do not provide for role interchange.

Synchronous Interfaces, Nested Co-Routines, and Stacks

It is known in the prior art to couple computationally dissimilar nodes over a synchronous request/response interface of the shared variable type. It is further known to ensure synchronous computation among coroutines by hierarchically nesting and modifying their calling relations in a predetermined manner. Lastly, it is known to use pushdown stacks as a construct for recursive processing. This is evidenced by the Brown, Carlson, and Tenenbaum references.

Brown et al., U.S. Pat. No. 4,736,321, "Communication Method Between an Interactive Language Processor Workspace and External Processes", issued Apr. 5, 1988, disclose an explicit remote function call and response across a shared variable type synchronous request/response interface. The call is made by a defined function from within an interpretive APL language workspace to an external compiled FORTRAN object. The APL-defined function calls the external function by name and explicit arguments. Responsively, the FORTRAN object operates on the arguments and returns a result. The defined function and the interface are locked for the duration of the remote call.

Carlson et al., U.S. Pat. No. 4,410,940, "Transfer of Control Among Hierarchical Cooperating Sequential Processes", issued Oct. 18, 1983, disclose a method for maintaining synchronous computations among a set of recursively nested cooperating sequential processes. Carlson achieves this by constraining transfers between processes to follow an implicit LIFO stack of process activation records using updated pointers.

As may be recalled, in a subroutine program structure, there exists an asymmetric master/slave relationship between a calling process and its subroutine. In contrast, coroutines are processes that may call each other but do not have this master/slave organization. That is, the relationship between coroutines is symmetric. Each coroutine is both master and slave. On exit from a coroutine, its state is saved. The next time the coroutine is called, it resumes at exactly the point where it left previously with all of its internal variables unchanged. This means that the previous state of the coroutine is restored.

Tenenbaum and Augenstein, "Data Structures Using PASCAL", copyright 1981 by Prentice-Hall Inc., pp. 56–75, describe a push-down stack as a dynamic data structure used in managing recursive computations such as those involving factorials. They exemplify a stack and pointer through use of a composite data type.

SUMMARY OF THE INVENTION

It is an object of this invention to devise a method for managing the flow of control of the peer-to-peer processing of a distributed application over a synchronous request/response (CALL/RETURN) interface where each side of the interface is managed by a finite state machine.

It is a related object that the provided method manage nested requests and responses.

It is yet another object that said method permit a graceful rolling back or undoing of an incomplete set of requests in the event of a fault.

It is a further object that the provided method permit persistence of servers across multiple requests. Relatedly, it is an object that such method provide for a role interchange between requesters and servers.

The foregoing objects are satisfied by a method utilizing, on each side of the interface, a decision table based finite state machine and a local LIFO stack of generated and received requests, responses, and input from the application. The local stack is run in a push-pop manner and assists the local decision table in conducting the peer-to-peer processing until the LIFO stack becomes exhausted. A fault on either side of the interface results in undoing the processing by unwinding each stack back to a predetermined point.

If one side operates as a persistent server, its application program environment is saved from one request to another by a dynamic save and simulated return to the application. Lastly, a request/demand is substituted for a demand/request by the server so as to change the server and requester roles of either side of the interface.

BRIEF DESCRIPTION OF THE DRAWINGS

FIG. 3 sets out a host KPE-based decision table and interpretation according to the invention.

FIG. 4 sets out a PWS DPE-based decision table and interpretation according to the invention.

DESCRIPTION OF THE PREFERRED EMBODIMENT

Peer Coupling and Layers

Figure 1:
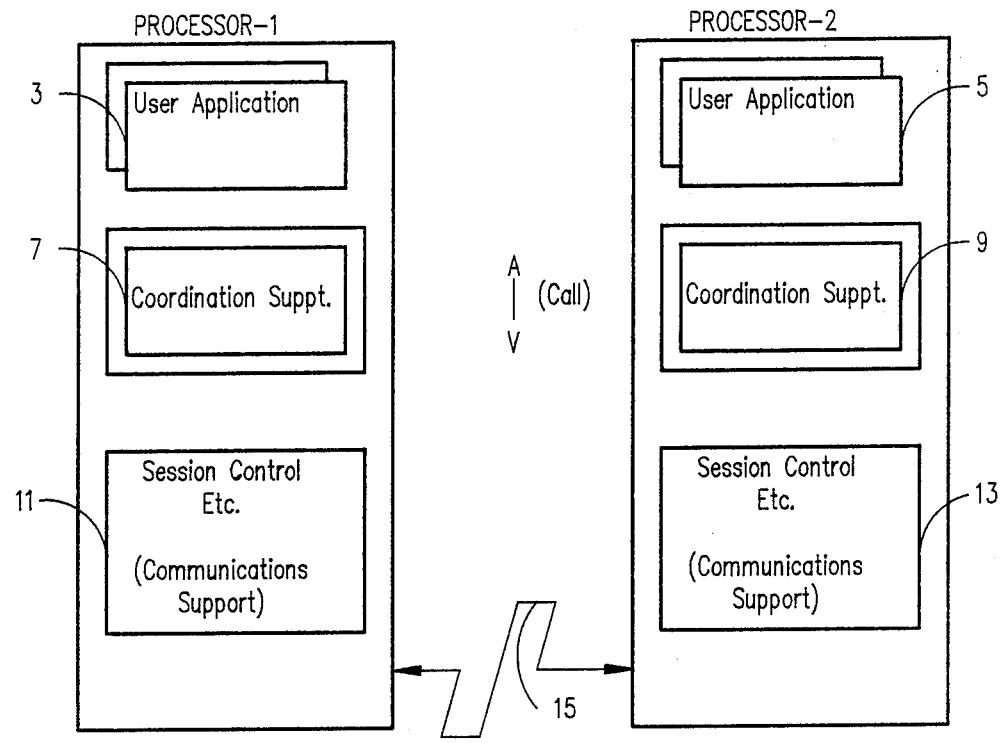
FIG. 1 shows placement of the coordination function according to the invention among peer-coupled processes in a distributed application.

Referring now to FIG. 1, there is shown the peer-to-peer processing flow among parts of a distributed application. Each processor (1, 2) supports at the top level an application (3, 5) or part thereof. A processor 1 communicates with another processor 2 over a well-defined communication path 15 such as a synchronous request-/response interface. An example of such an interface is the IBM Server/Request Programming Interface (SRPI) described in IBM publications "IBM Personal Computer Enhanced Connectivity Facilities", GC23-0957; and "Programmer's Guide to the Server-Requester Programming Interface for the IBM Personal Computer and the IBM 3270 PC", SC23-0959, copyright 1986 by International Business Machines Corporation.

Neither the interface 15 nor its direct communications support 11, 13 are the objects of this invention and are not further described except by reference to the aforementioned publications. From a software layer perspective, the method 7, 9 of this invention is interposed between the application layer 3, 5 and the communications interface support level 11, 13.

Nesting of Requests and Responses

It should be appreciated that the method assists and coordinates the flow of control among peer-coupled processes. For instance, process A at a DPE requests/invokes a function at a KPE process B. Process B may complete the function and return control to process A. Alternatively, process B may request further information from process A prior to completion of the original request. This leads to a nesting relationship among the requests and responses.

Request/Response Interface is Half Duplexed

The method of this invention assumes that the synchronous request/response interface provides for half-duplexed communication (one side sends while the other receives) with orderly alternation of sender and receiver. The method also assumes that the process on each side of the interface is logically synchronous. This means that if the process on one side has multiple threads or tasks, they are viewed as a single process or call stack.

LIFO Stack

A push-down, pop-up, or last-in/first-out (LIFO) stack is maintained on each side of the interface to assist a decision table implemented finite state machine in maintaining a syntactically correct sequence of request-/response processing. A request function is usually pushed onto the stack. Subordinate requests would be pushed on top and popped therefrom as they are completed. This permits the stack to faithfully track the peer-coupled processing. Software implementing and managing of such stacks is set out in the Tenenbaum reference.

Illustrative Example and Protocol

Figure 2:
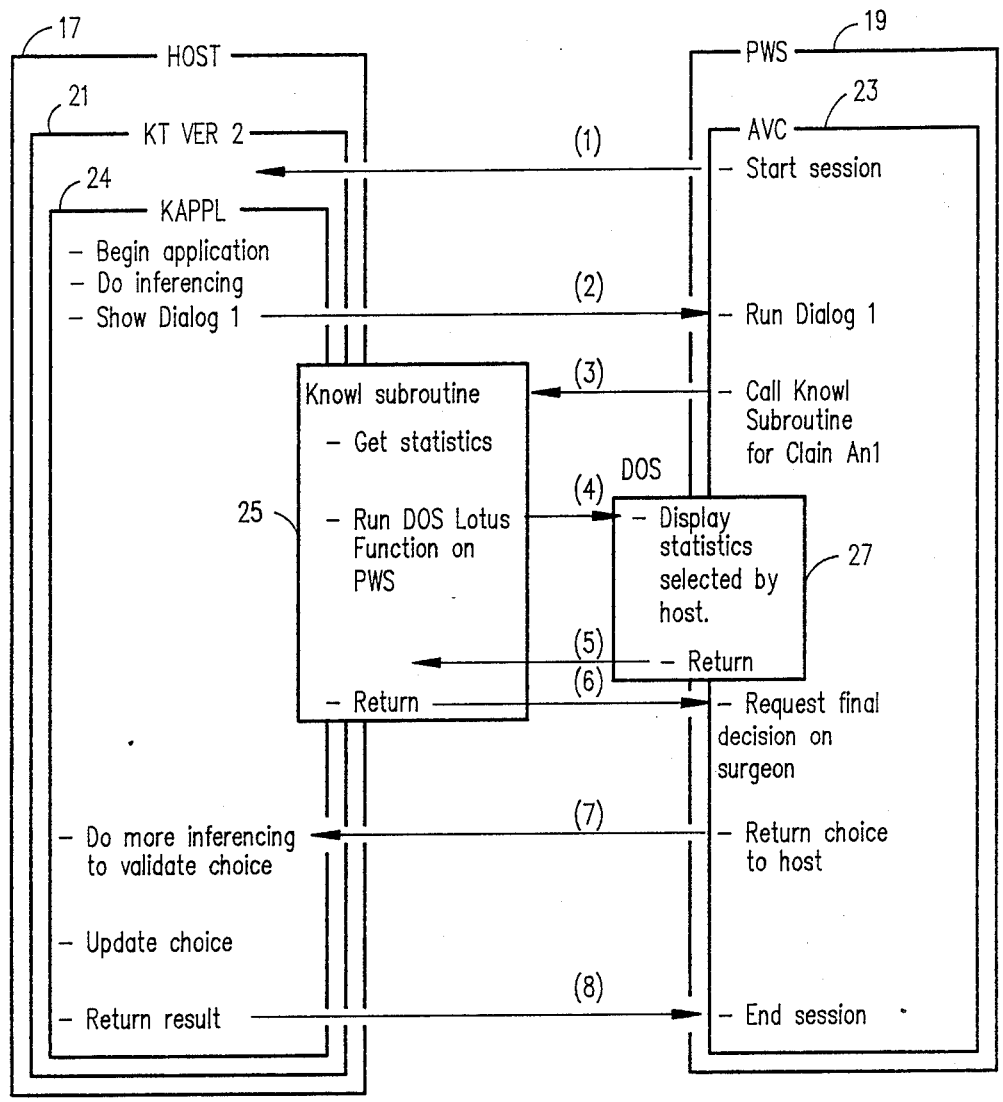
FIG. 2 depicts both the coordination method and a persistent server application between peer-coupled processes residing at a host and a PWS.

Referring now to FIG. 2, there is depicted both the coordination method and a persistent server application between peer-coupled processes residing at a host and a PWS. Numbers in parentheses are correlated with the requests and responses used in the application. In the ensuing description of the preferred embodiment, reference will be made to FIG. 2, together with the decision tables local to the host in FIG. 3 and to the PWS in FIG. 4.

The description is based on an example drawn from the medical insurance field. The example assumes a benefits administrator sited at a PWS assisting an insured party in the selection of a physician. Selected information processing involves the PWS instigating the host.

Referring again to FIG. 2, the audio-visual computer (AVC) application being run upon the PWS is likely to be a computationally intensive audio-visual data processing task. The KAPPL application being run on the host is a mixed data base referencing and rule-based evaluation task.

Briefly, PWS 19 directly supports execution of the application 23 denominated AVC. AVC starts a session by invoking (1) host 17 KPE environment 21. KPE supports execution of the application 24 denominated KAPPL. KAPPL performs mixed rule-based and procedural processing and, at a predetermined point, requests (2) PWS AVC application to perform remote dialog function. The AVC in turn makes an information request (3) of KAPPL. Nested within this information request (3) and its response (6) is a subordinate request (4) and response (5) to a KPE subroutine 25 and counterpart DPE-driven display 27.

Construing the Peer Coupling and the Decision Tables

A cycle of interpreting FIGS. 2–4 would be instructive. Step (1) in FIG. 2 involves invocation of the KAPPL at the host. At the host, assume that the KAPPL application inputs a code denominated '41' to the host-based, decision table implemented, finite state machine.

Referring to FIG. 3, there is shown the decision tables for the host-based machine. Note, the objective is to ascertain the next function to be performed with respect to either a request or a response. The next function to be selected will be a call to PWS. This is determined by the fact that the input '41' found on row 5 is provided by the application and not from the PWS. The column coordinate is to be found at column 5 since there is no function to be found at the top of the local LIFO stack. The selected function "C1" at row 5, column 5, requires the finite state machine to send function '41' and any data to PWS and push the indicia of function '41' onto the LIFO stack. The next round is sited at PWS.

Referring now to FIG. 4, there is shown the decision tables for the PWS-based finite state machine. Since the input '41' from the host is entered at row 5 and there is no function in the local PWS LIFO stack, then the selected PWS function to be performed is "A1" at row 5, column 1. Function A1 calls for a return to the caller host and pushes the function '41' onto the local stack.

Request/Response Conceptualization

To assist with the conceptualization of the ping-pong type interaction, a schema is used placing the host and its activities on the left-hand side and the PWS and its activities on the right-hand side.

In the steps below which refer to the steps in FIG. 2, each application or external description of the step is immediately followed by a description which shows the interaction of the coordination function in the PWS and host. Since the processing is logically serial, each step is shown as a series of actions and data. The term ROW N COL M refers to the appropriate (Host or PWS) decision table's row and column intersection.

```
HOST
    Action causing entry to coordination function
        (input or return parameter description)
            input STACK contents ROW N COL M resulting from above inputs
            output STACK contents Action taken per decision table Send to other side  <————>
                    PWS
                        (input from other processor)
                            input STACK contents ROW N COL M resulting
                            from above inputs
                            output STACK contents Action taken per decision
                            table
```

Conceptualization of the Actions Expressed in Example

Following are the action steps defined first at the application level in FIG. 2, and second including information regarding accessing the local decision table based finite state machine and stack.

1. The administrator starts a session from FWS causing the host knowledge application to be initiated.

```
HOST                    PWS
                Initial coordination setup
                (Establish host session,
                    and initialize SRPI)
                Begin execution of AVC
                    dialog appl
                AVC dialog appl calls
          <———Request execution of KAPPL
                    in host
                            STACK -

Server initiation,
invocation of KAPPL
```

2. The host application calls on AVC to show X-RAYS and playback of two doctors' opinions of the condition and proposed treatment for the administrator's use, and begins to collect information for a decision from the insured and the system.

```
HOST                            PWS
    KAPPL Call PWS-KR
        (Fnc 41,data)
                STACK -

ROW 5 COL 5
                STACK 41

Send to PWS  ————> (Fnc 41,data)
                                STACK -

ROW 5 COL 1
                                STACK 41

Return to AVC (Fnc 41,data)
```

3. The administrator wants to refer to current statistical data and be able to manipulate it in spreadsheet form, and indicates this through AVC dialog. AVC dialog requests invocation of the host knowledge subroutine.

```
HOST            PWS
            AVC dialog appl
            Call PWS REQ (Fnc 31,Name,data)
                            STACK 41

ROW 3 COL 8
                            STACK 31
                                41

(Fnc 31,Name,data) <——— Send to host
                    STACK 41

ROW 3 COL 4
            STACK 31
                41

Load and call name (Fnc 31,Name,data)
```

4. The host knowledge subroutine gets the latest data via some host function (e.g., SQL/DS or Database 2 data base access) and requests that the data be sent along with a DOS command to show the data on a Lotus spreadsheet. At its simplest, this could be the same of a BAT file with a parameter identifying the spreadsheet of interest selected from among a set regularly downloaded to an analyst's AVC by other customer business functions.

```
HOST                          PWS
   Named host KR
      Call PWS KR (Fnc 31,Name,data)
                                STACK 31

41
                                    -
   ROW 3 COL 7
                                STACK 31

31
                                   41
                                    -
Send to PWS ─────────▶(Fnc 31,Name,data)
                                STACK 31

41
                                    -
   ROW 3 COL 3
                                STACK 31

31
                                   41
                                    -
   Load and Call Name (Fnc 31,Name,data)
```

5. After examining the spreadsheet, manipulating it, and consulting with the insured, the administrator terminates the spreadsheet.

```
HOST              PWS
             Name'd program returns
             to PWS REQ (Fnc 32,data)
                                STACK 31

31
                                   41
                                    -
             ROW 4 COL 9
                                STACK 31

41
                                    -
(Fnc 32,data) ◀────── Send to host
                                STACK 31

31
                                   41
                                    -
   ROW 4 COL 3
                                STACK 31

41
                                    -
   Return to name (Fnc 32,data)
```

6. The host knowledge subroutine returns which, in turn, allows the administrator to convey the insured's decision to the AVC application.

```
HOST                          PWS
   Named host KR
      Return to PWS KR (Fnc 32,data)
                                STACK 31

41
                                    -
   ROW 4 COL 9
                                STACK 41

Send to PWS ─────────▶ (Fnc 32,data)
                                STACK 31

41
                                    -
   ROW 4 COL 3
                                STACK 41

Return to caller (Fnc 32,data)
```

7. The AVC application transmits the insured's decision and new information via common knowledge back to the host part of the knowledge application where further inferencing occurs to revalidate the decision. If the decision is valid, then the session will be terminated; otherwise 2-7 could be replayed with different data until a valid decision is reached.

```
HOST              PWS
                  AVC dialog appl calls
                  PWS REQ (Fnc 42,data)
                                STACK 41

ROW 6 COL 8
                                STACK -

(Fnc 42,data) ◀────── Send to host
                                STACK 41

ROW 6 COL 4
                                STACK -

Return to KAPPL (Fnc 42,data)
```

8. The administrator decides to end the session

```
HOST                          PWS
   KAPPL returns,
   Server session terminates
      Send to PWS─────────▶(Termination code (success)
                            initialize SRPI)
                            Special termination logic
                            Return to caller
                            (Termination . . . )
                                STACK -

Server terminates
```

Knowledge Processing Environment

The host supports a knowledge processing environment. By this is meant that facilities are extent for running applications including procedural code interspersed with sequences of code involving rule-based programming or production systems.

A description of a cyclic, forward-chained, rule-based, data object sensitive production system is set out in copending application Ser. No. 07/114,485, filed on Oct. 28, 1987. Said application is incorporated herein by reference. The object-sensitive, rule-based system described in the copending application includes means for storing data objects and rules, and means cooperating with the storage means for executing a control cycle.

KnowledgeTool ®

The high-level procedural language facility of choice at the host is KnowledgeTool. This was first made available by IBM in December 1987. It is described in IBM publications "IBM KnowledgeTool User's Guide and Reference Release 1", SH20-9251, copyright 1987 by IBM.

This facility includes a PL/I compiler, rule-based language extensions and constructs based on the Carnegie-Mellon OPS5 forward-chained language system, and other constructs such as frames and frame management.

The KnowledgeTool system utilizes a method for compiling a data-driven, forward-chaining production system from a source code sequence combinatorially selected from a set consisting of block-structured language instructions (PL/I) and a rule-based extension of primitives (RESP). The extension primitives include such invocable constructs as a data base, a set of rules, and an inference engine.

The data base (working memory) includes data structures representative of the domain of the production system. The set of rules (production memory) is representative of domain knowledge of the production system. Lastly, the inference engine executes each rule selected from the set of rules whose patterns match the change in the data base occurring in a prior recurrent match, selection, and execution cycle.

Creation of a host executable application involves (a) forming and recording a sequence of instructions including said primitives; (b) converting the sequence into source code of the block-structured language and a description of the production memory; (c) forming a runtime executable production system including a comparison (RETE) network from the source code and the description; and (d) debugging said production system by selectively executing portions thereof and altering the source code at a demand/responsive, man/machine interface, and compiling out an object code version of the procedural language sequences and link editing them to the appropriate production system invocations.

Host-based Coordination Function

The coordination function as expressed in an extended language assigns specific function codes, subsets the application request into two subtypes, and subsets all response function codes into normal and exception responses for each valid request type.

The sequence of actions which is considered valid includes:
1. Initialization as performed by a request from the operating system function such as MVSSERV/CMSSERV. This invokes the software for managing the host side of the interface relative to the PWS.
2. Managing a request which contains the name of a program to invoke under KBS control in the parameter area of the CPRB. No data accompanies this request.
3. Invocation of the host-based application which contains a parameter list. The list has one of the function codes (all function codes are in hexadecimal) 21, 31, or 41. This request is transmitted along with any common values to the PWS as its response to the initial request. See the cross-referenced, copending Beitel et al. application for further discussion of sharing and updating common values implicitly.

From this initial invocation sequence, the following pattern of interactions with the PWS is considered to be valid.

Referring again to FIG. 2, the host maintains a stack of requests. As FIG. 2 shows, the host validates the sequence of requests and their responses. It is the responsibility of the applications to coordinate the proper sequencing of their requests and responses. The diagnostic information will contain the stack depth and contents, so the offending requestor may provide an error response set to clear the stack.

The rules associated with the request/response sequences are simple to monitor and enforce. They are in no way restrictive to the flow of data between the PWS application and the host application. While the depth of the stack could impose a restriction, the fact that it is single byte wide allows it to be arbitrarily deep, thereby imposing no practical limit. The validation of the requests and responses can be an important debugging aid, and an important problem determination tool.

PWS-based Coordination Function

A similar validation is performed by the PWS code which manages the communications interface for its conversation with the host process.

The sequence of actions which is considered valid by the PWS side of the support is as follows:
1. Initialization is performed by a request to the conversation code which initiates the communication with the host session. The initial request contains the name of the controlling application on the host.
2. A request is made which contains the name of a program to invoke under KPE control. No data accompanies this request.

NOTE: The initial requestor is returned to upon receipt of the first function code 21 or 41 transmitted from the host when the stack is empty.

From this initial invocation sequence, the pattern of interactions with the host is considered to be valid.

The Persistent Server

Figure 5:
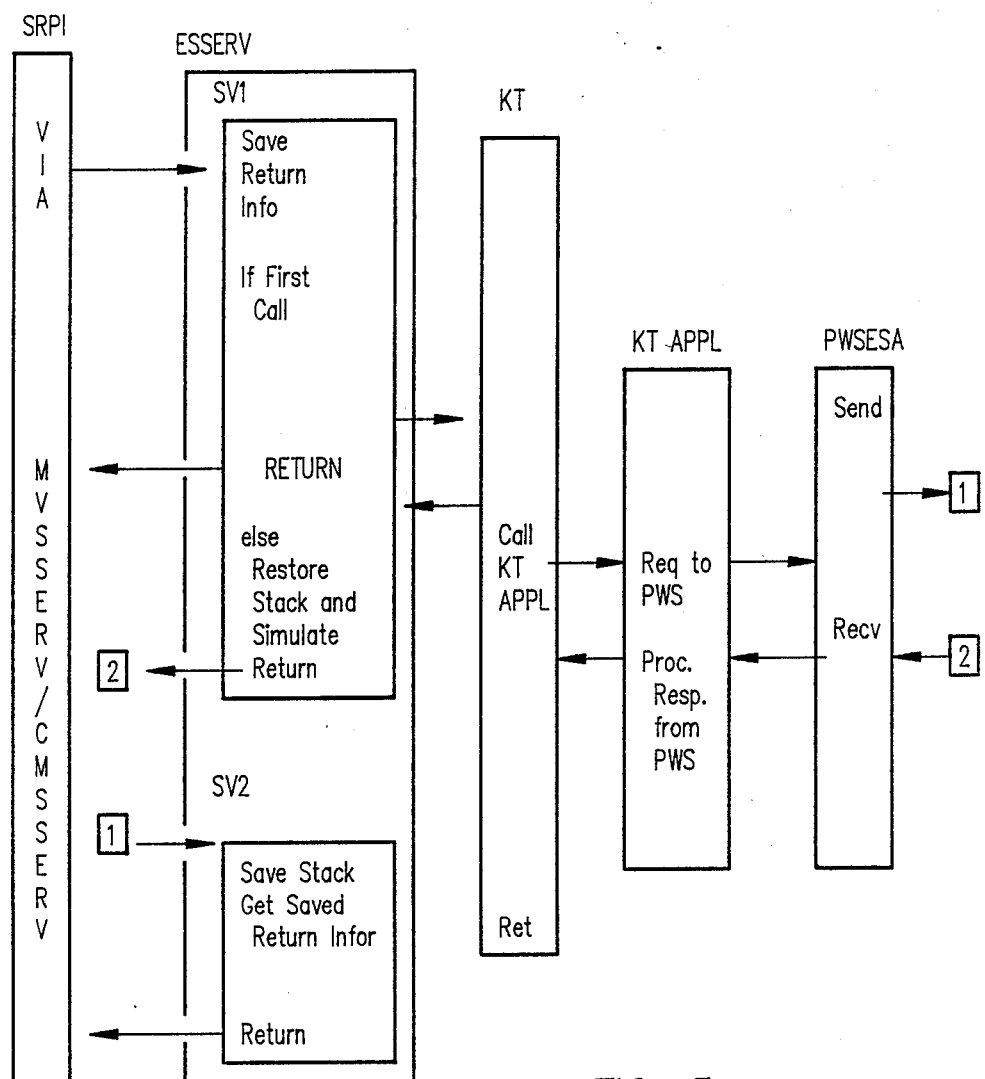
FIG. 5 illustrates an overview of the call/return patterns in implementing a persistent server according to the invention.

Referring now to FIG. 5, there is shown an overview of the call/return patterns in implementing a persistent server according to the invention. In this regard, the host operates as the server and the PWS as the requester. If the host application is such that the server should persist over two or more requests, then the application programming environment is dynamically saved prior to sending a response to the PWS. A simulated return is made to the application and PWS. On the next request, the application program environment is restored.

Rollback

The preferred error recovery is to unwind the request/response stack to a point agreed upon by both sides as acceptable. This can be accomplished by the application on each side. This would be transparent to the management of the peer-to-peer processing. However, to accomplish this at the peer-to-peer level, an adjustment or provision should be made in the functions and decision tables. Note that if the width of the stack entry includes a pointer variable, a language implementation dependent method can be used.

We claim:

1. A method for managing peer-to-peer processing of a distributed application over a synchronous request/response (CALL/RETURN) interface, peer-to-peer processing connoting execution of at least one application or part thereof on at least a first and a second communicating processor (CP), said first and second CP including counterpart first and second stacks of indicia of CP and interface activity, comprising the steps of:

(a) generating and communicating either a request or a response from the first CP to the second CP over the synchronous interface, said generating and communicating step being responsive to either a request or response from the second CP, input received from the application, or indicia provided by the first stack or operated according to a LIFO discipline;

(b) concurrently pushing or popping onto or from the first stack indicia of each generated or received request or response from or to the first CP; and (c) repeating steps (a)-(b) until the first stack becomes exhausted.

2. The method according to claim 1, wherein the first stack preserves a nested windup and unwind order among the indicia of requests and responses; and wherein said method further comprises the step of:

(d) responsive either to fault local to the first CP, or, a request or response from the second CP indicative of a fault, UNDOing the processing by unwinding the indicia in the first stack back to a predetermined point.

3. The method according to claim 1, wherein the first CP being operative as a server by receiving only requests and generating only responses, the indicia in the first stack of the server normally being erased concurrent with the response from the server concluding the request, and, wherein the second CP being operative as a requester by receiving only responses and generating only requests; and wherein said method further comprises the step of:

(e) dynamically saving any indicia remaining in the first stack prior to the first CP sending a concluding response to the second CP, and (f) simulating a return to the application by said first CP, and in the event of a second request, restoring the indicia dynamically saved in step (e), and utilizing the restored indicia in composing a response to said second request.

4. The method according to claim 3, wherein said method further comprises the step at the first CP of:

(g) causing a CALL/RETURN instead of a RETURN/CALL response to reverse requester and server roles of the first and second CP's 5. The method according to claim 1, wherein the first CP is a knowledge processing environment and the second CP is a data processing environment.

6. A method for managing peer-to-peer processing of a distributed application over a synchronous request/response (CALL/RETURN) interface, peer-to-peer processing connoting execution of at least one application or part thereof on at least a first and a second communicating processor (CP), said first and second CP including counterpart first and second stacks of indicia of CP and interface activity, comprising the steps of:

(a) generating and communicating either a request or a response from the first CP to the second CP over the synchronous interface, said generating and communicating step being responsive to either a request or response from the second CP, input received from the application, or indicia provided by the first stack operated according to a LIFO discipline;

(b) concurrently pushing or popping onto or from the first stack indicia of each generated or received request or response from or to the first CP, the first stack preserving a nested windup and unwind order among the indicia of the requests and responses;

(c) repeating steps (a)-(b) until the first stack becomes exhausted; and (d) responsive either to a fault local to the first CP, or, a request or response from the second CP indicative of a fault, UNDOing the processing by unwinding the indicia in the first stack back to a predetermined point.

7. The method according to claim 6, wherein the first CP being operative as a server by receiving only requests and generating only responses, the indicia in the first stack of the server normally being erased concurrent with the response from the server concluding the request, and, wherein the second CP and its local finite state machine being operative as a requester by receiving only responses and generating only requests; and wherein said method further comprises the step of:

(e) dynamically saving any indicia remaining in the first stack prior to the first CP sending a concluding response to the second CP, and (f) simulating a return to the application by said first CP, and in the event of a second request, restoring the indicia dynamically saved in step (e) and utilizing the restored indicia in composing a response to said second request.

8. The method according to claim 7, wherein said method further comprises the step at the server side of:

(f) causing a CALL/RETURN instead of a RETURN/CALL response to reverse server and requester roles of the first and second CP's.

9. A method for controlling recursive requests and responses as generated during execution of an application distributed over a knowledge processing environment (KPE) and at least one data processing environment (DPE), at least one KPE process communicating with at least one DPE process over a demand/response interface, comprising the steps of:

(a) invoking execution of a KPE application responsive to a OPE request;

(b) at the KPE, sending a CALL (function, data) to the DPE, applying indicia of the CALL and function to KPE LIFO stack, and continuing execution of the application;

(c) at the DPE, responsive to the KPE CALL (function, data), executing the function, responding to the KPE according to an activity selected from a set consisting of a RETURN indicating that the function has been completed, a CALL (function, data) to the KPE, or no reply, applying indicia of KPE CALL and function, and applying indicia of the DPE response to a DPE LIFO stack, and continuing execution of the application;

(d) at the KPE, responsive to either a DPE RETURN or CALL and function, responding to the DPE according to an activity selected from a set consisting of a RETURN indicating that the function has been completed, a CALL (function, data) to the DPE, or no reply, applying indicia of DPE CALL and function, and the DPE response to the DPER LIFO stack, and continuing execution of the application; and (e) repeating steps (b)-(d) until indicia of calls and responses have been unwound according as to whether said indicia were appended to either the DPE or KPE LIFO stacks.

* * * * *